US 9,765,613 B2

(12) United States Patent
Cramer et al.

(10) Patent No.: US 9,765,613 B2
(45) Date of Patent: Sep. 19, 2017

(54) DRILLING SYSTEM AND ELECTROMAGNETIC TELEMETRY TOOL WITH AN ELECTRICAL CONNECTOR ASSEMBLY AND ASSOCIATED METHODS

(71) Applicant: APS Technology, Inc., Wallingford, CT (US)

(72) Inventors: David Cramer, Okotoks (CA); Andrew Roberts, Meriden, CT (US)

(73) Assignee: APS Technology, Inc., Wallingford, CT (US)

( * ) Notice: Subject to any disclaimer, the term of this patent is extended or adjusted under 35 U.S.C. 154(b) by 288 days.

(21) Appl. No.: 14/195,217

(22) Filed: Mar. 3, 2014

(65) Prior Publication Data

US 2015/0247401 A1  Sep. 3, 2015

(51) Int. Cl.
| | |
|---|---|
| *G01V 3/00* | (2006.01) |
| *E21B 47/12* | (2012.01) |
| *G01V 3/26* | (2006.01) |
| *H01F 41/00* | (2006.01) |
| *E21B 17/00* | (2006.01) |

(52) U.S. Cl.
CPC .......... *E21B 47/122* (2013.01); *E21B 17/003* (2013.01); *G01V 3/26* (2013.01); *H01F 41/00* (2013.01); *Y10T 29/4902* (2015.01)

(58) Field of Classification Search
CPC ... G01V 3/30; G01V 3/26; G01V 3/28; G01V 3/08; G01V 2210/6163; H01Q 1/04; E21B 47/011; E21B 47/01; E21B 47/12; E21B 47/02216; E21B 47/122; E21B 17/00; E21B 17/003; E21B 21/103

USPC .............. 324/333, 334, 338, 346, 351, 355
See application file for complete search history.

(56) References Cited

U.S. PATENT DOCUMENTS

| | | | |
|---|---|---|---|
| 2,225,668 A | 12/1940 | Subkow | |
| 2,225,688 A | 12/1940 | Subkow | |
| 3,411,584 A | 11/1968 | Sizer | |
| 3,518,609 A * | 6/1970 | Fontenot, Jr. | ......... E21B 17/028 175/104 |
| 3,765,494 A | 10/1973 | Kielman, Jr. | |
| 4,066,128 A | 1/1978 | Davis | |
| 4,130,162 A | 12/1978 | Nelson | |

(Continued)

FOREIGN PATENT DOCUMENTS

| | | |
|---|---|---|
| CA | 2760931 A1 | 6/2013 |
| CA | 2786471 A1 | 7/2013 |

(Continued)

OTHER PUBLICATIONS

Gvelasco Quesada, Novel Advances in Microsystems Technologies and Their Applications, CRCPress, Chapter21, Aug. 2013, p. 348, 3 pgs.

(Continued)

*Primary Examiner* — Patrick Assouad
*Assistant Examiner* — Sean Curtis
(74) *Attorney, Agent, or Firm* — Baker & Hostetler LLP; Gregory A. Grissett (57) ABSTRACT

A drilling system including a drill string, an EM telemetry assembly, and an electric contact assembly that defines an electrical connection with the drill string. The electric contact assembly permits a portion of the EM tool to slide along a portion of the drill string during drill string assembly.

39 Claims, 6 Drawing Sheets

(56) References Cited

U.S. PATENT DOCUMENTS

| | | | |
|---|---|---|---|
| 4,216,536 A * | 8/1980 | More | E21B 47/124 166/254.2 |
| 4,348,672 A | 9/1982 | Givler | |
| 4,416,330 A | 11/1983 | Merritt | |
| 4,630,243 A * | 12/1986 | MacLeod | E21B 47/122 175/42 |
| 4,689,775 A | 8/1987 | Scherbatskoy | |
| 4,825,946 A | 5/1989 | Schnatzmeyer | |
| 5,189,415 A | 2/1993 | Shimada | |
| 5,463,313 A | 10/1995 | Berkan | |
| 5,782,261 A | 7/1998 | Becker | |
| 5,818,352 A | 10/1998 | McClure | |
| 5,955,884 A | 9/1999 | Payton | |
| 5,959,548 A | 9/1999 | Smith | |
| 6,018,602 A | 1/2000 | Smith | |
| 6,111,409 A | 8/2000 | Edwards | |
| 6,364,035 B2 | 4/2002 | Brune | |
| 6,367,323 B1 | 4/2002 | Camwell | |
| 6,411,078 B1 | 6/2002 | Nakagawa | |
| 6,417,666 B1 | 7/2002 | Mercer | |
| 6,470,274 B1 * | 10/2002 | Mollison | G01V 11/00 702/12 |
| 6,531,871 B1 * | 3/2003 | Hay | E21B 47/122 175/40 |
| 6,657,597 B2 * | 12/2003 | Rodney | G01V 11/002 340/854.6 |
| 6,810,955 B2 | 11/2004 | Roth | |
| 6,896,050 B2 | 5/2005 | Biglin et al. | |
| 6,915,849 B2 * | 7/2005 | Nuth | E21B 17/003 166/242.2 |
| 7,151,466 B2 | 12/2006 | Gabelmann | |
| 7,170,423 B2 * | 1/2007 | Wisler | E21B 47/122 340/853.7 |
| 7,178,608 B2 | 2/2007 | Mayes et al. | |
| 7,204,309 B2 | 4/2007 | Segura | |
| 7,213,607 B2 | 5/2007 | De Almeida | |
| 7,243,028 B2 | 7/2007 | Young | |
| 7,296,639 B2 | 11/2007 | Millar et al. | |
| 7,327,144 B2 | 2/2008 | Brune | |
| 7,480,207 B2 * | 1/2009 | Marsh | E21B 47/182 340/853.1 |
| 7,506,699 B1 | 3/2009 | Harvey | |
| 7,506,700 B1 | 3/2009 | Harvey | |
| 7,536,262 B2 | 5/2009 | Hornbostel | |
| 7,681,663 B2 * | 3/2010 | Cobern | E21B 47/024 175/45 |
| 7,775,301 B2 | 8/2010 | Brune | |
| 7,832,503 B2 * | 11/2010 | Sand | E21B 4/00 175/107 |
| 8,069,931 B2 | 12/2011 | Hooks | |
| 8,154,420 B2 | 4/2012 | Petrovic | |
| 8,464,798 B2 | 6/2013 | Nadkrynechny | |
| 8,474,548 B1 | 7/2013 | Young | |
| 8,729,901 B2 | 5/2014 | Lam | |
| 8,952,700 B2 | 2/2015 | Wisler | |
| 9,071,062 B2 | 6/2015 | Whitehead | |
| 9,291,049 B2 | 3/2016 | Switzer | |
| 9,303,465 B2 * | 4/2016 | Pare | E21B 17/06 |
| 9,328,603 B2 * | 5/2016 | Pope | E21B 47/01 |
| 9,453,397 B2 | 9/2016 | Dowling et al. | |
| 2002/0170711 A1 * | 11/2002 | Nuth | E21B 17/003 166/254.2 |
| 2004/0004553 A1 * | 1/2004 | Rodney | G01V 11/002 340/853.3 |
| 2004/0035575 A1 | 2/2004 | Roth | |
| 2004/0104047 A1 | 6/2004 | Peter | |
| 2004/0156264 A1 * | 8/2004 | Gardner | H04L 27/2601 367/81 |
| 2004/0169367 A1 | 9/2004 | Sutherland et al. | |
| 2005/0016771 A1 | 1/2005 | Mayes | |
| 2005/0046587 A1 | 3/2005 | Wisler | |
| 2005/0061369 A1 | 3/2005 | De Almeida | |
| 2005/0140373 A1 | 6/2005 | Li | |
| 2006/0041795 A1 | 2/2006 | Gabelmann | |
| 2006/0124354 A1 * | 6/2006 | Witte | E21B 4/003 175/40 |
| 2006/0202852 A1 * | 9/2006 | Peter | E21B 17/028 340/854.6 |
| 2007/0247328 A1 * | 10/2007 | Petrovic | G01V 11/002 340/853.7 |
| 2007/0251729 A1 * | 11/2007 | Sand | E21B 4/00 175/107 |
| 2009/0261986 A1 * | 10/2009 | Mehta | G01V 11/002 340/853.6 |
| 2010/0258351 A1 | 10/2010 | Hooks | |
| 2010/0262370 A1 | 10/2010 | Bittar | |
| 2011/0017512 A1 * | 1/2011 | Codazzi | E21B 47/122 175/40 |
| 2011/0061864 A1 | 3/2011 | Umphries | |
| 2011/0304220 A1 | 12/2011 | Whitehead | |
| 2012/0126992 A1 * | 5/2012 | Rodney | E21B 33/0355 340/850 |
| 2013/0009646 A1 | 1/2013 | Simon | |
| 2013/0014992 A1 * | 1/2013 | Sharp | E21B 47/024 175/45 |
| 2013/0169278 A1 | 7/2013 | Bittar | |
| 2013/0176139 A1 * | 7/2013 | Chau | G01V 3/30 340/854.4 |
| 2013/0241561 A1 | 9/2013 | Allen | |
| 2013/0241742 A1 | 9/2013 | Contant | |
| 2013/0265171 A1 * | 10/2013 | Hay | E21B 17/003 340/854.4 |
| 2014/0032116 A1 * | 1/2014 | Guner | G01V 3/28 702/6 |
| 2014/0048332 A1 | 2/2014 | Schmidt | |
| 2014/0110395 A1 * | 4/2014 | Parsche | E21B 43/2401 219/481 |
| 2015/0053485 A1 * | 2/2015 | Altimas | E21B 4/02 175/41 |
| 2015/0145687 A1 * | 5/2015 | Roberts | E21B 47/122 340/853.2 |
| 2015/0218938 A1 * | 8/2015 | Weisbeck | E21B 21/16 73/152.46 |
| 2015/0247401 A1 * | 9/2015 | Cramer | E21B 47/122 324/338 |
| 2015/0276970 A1 * | 10/2015 | Wu | E21B 47/00 702/7 |
| 2015/0293254 A1 * | 10/2015 | Wang | G01V 3/26 324/355 |
| 2016/0003035 A1 | 1/2016 | Logan | |
| 2016/0138388 A1 * | 5/2016 | Chau | G01V 3/30 340/854.4 |
| 2016/0146000 A1 * | 5/2016 | Logan | E21B 47/122 340/853.1 |
| 2016/0245068 A1 | 8/2016 | Cramer | |
| 2016/0290066 A1 | 10/2016 | Frith | |
| 2016/0369615 A1 | 12/2016 | Cune et al. | |

FOREIGN PATENT DOCUMENTS

| | | |
|---|---|---|
| CA | 2786471 C * | 8/2014 |
| EP | 0911484 A2 * | 4/1999 |
| EP | 0913555 A2 * | 5/1999 |
| EP | 0922836 A1 * | 6/1999 |
| GB | 2008899 A | 6/1979 |
| WO | WO 2006028701 A2 * | 3/2006 |
| WO | WO2006028701 A2 | 3/2006 |
| WO | WO2012175658 A2 | 6/2012 |
| WO | WO 2012175658 A2 * | 12/2012 |

OTHER PUBLICATIONS

International Patent Application No. PCT/US2014/066801; Notification of Transmittal of the International Search Report and the Written Opinion of the International Searching Authority mailed Jul. 21, 2015, 16 pgs.

International Patent Application No. PCT/US2015/018249; Notification of Transmittal of the International Search Report and the Written Opinion of the International Searching Authority mailed May 21, 2015, 10 pgs.

(56) References Cited

OTHER PUBLICATIONS

International Patent Application No. PCT/US2015/031467; Notification of Transmittal of the International Search Report and the Written Opinion of the International Searching Authority mailed Aug. 19, 2015, 8 pgs.
International Application No. PCT/US2015/031467: International Preliminary Report on Patentability dated Dec. 1, 2016, 7 pages.
International Application No. PCT/US2015/018249: International Preliminary Report on Patentability dated Sep. 6, 2016, 6 pages.

* cited by examiner

DRILLING SYSTEM AND ELECTROMAGNETIC TELEMETRY TOOL WITH AN ELECTRICAL CONNECTOR ASSEMBLY AND ASSOCIATED METHODS

TECHNICAL FIELD

The present disclosure relates to a drilling system, and more specifically, to a drilling system including an electromagnetic telemetry tool with an electrical connector assembly and associated methods.

BACKGROUND

Drilling systems used to drill wells for oil, gas and other purposes may be thousands of feet underground, change direction, and extend horizontally. To help maximize drilling efficiency, telemetry is used while drilling to transmit data from sensors located downhole to the surface as a well is drilled. Obtaining and transmitting information is commonly referred to as measurement-while-drilling (MWD) and logging-while-drilling (LWD). One transmission technique is electromagnetic telemetry or (EM) telemetry. Typical data includes formation characteristics, well path direction and inclination, and various other drilling parameters. In particular, MWD and LWD systems have used EM tools, located downhole and coupled to sensors along the drill string, to create electric and magnetic fields that propagate through the formation where they may be detected at the surface. EM tools typically include a transmitter, a means, typically called a gap sub, for electrically isolating an upper portion of the drill string from a lower portion of the drill string, an electrode, a power source and sensors. EM tools are configured to convey electrical power from the transmitter mounted in the flow sub, past the insulated portions of the gap sub assembly, to a contact point located uphole from the insulated portion, in order to help create the EM field that conveys drilling data to a receiver on the surface. Because the gap sub assembly is typically located above and attached to the flow sub, a portion of the electrode is typically securely mounted to the inner wall of the gap sub assembly by some means such as bolts or other fasteners, and the transmitter or housing is attached downhole in the flow sub.

Before drilling can begin, multiple components, including the drill bit, special tools, and drill collars, are assembled progressively end-to-end and lowered into the borehole, followed by drill pipe. The various components and drill pipe together form the drill string. Assembling these components and drill pipe is referred to as a "makeup" operation. EM tools are attached to, or positioned, in the drill string during the make-up operation. Fixed mount EM tools, as noted above, are thus mounted inside the drill string during make-up at two spaced apart mount locations: 1) a downhole mount location within the flow sub; and 2) an uphole mount location mount for a contact point above the electrically isolated section of a gap sub assembly. The mount locations typically define electrical connections with the drill string, which are used to help create EM fields used for data transmission.

Ideally, fixed mount EM tools are designed to have the same fixed length between the two mount locations discussed above. In practice at a drill site, this is seldom the case. Drill string components are mixed and reused from drilling one well to another. Variances in distance between the two mount locations are the result of several factors. One factor is manufacturing tolerances in components, e.g. between gap and flow subs. Due to tolerances, gap and flow subs can vary slightly in length, in addition, the specific location of mounting points in these components can vary. Another factor is component wear and application of different amounts of torque from one use to the next. Torque and wear allow the components to screw more or less closely together which result in altering the distance between the two mount locations. Another factor is the need to rework component ends. Worn gap sub and flow sub ends are reworked to ensure a strong connection between adjacent components. Reworking may result in a shorter sub length when the ends are cut off and new threads are machined. Because the mount locations are initially located in separate components, such as the gap sub and flow sub, the drill operator must accommodate the variance in distance between mounting points during a make-up to ensure that electrical connections are formed with the drill string for proper EM telemetry operation later during the drill operation.

Shafts, subs with spacers, bayonet style connectors, and/or telescoping electrode shafts have been used to accommodate variances in distance between the two mount locations or to change the mount locations so that the two mount locations are spaced apart the required distance while still allowing adjacent drill string components to be appropriately connected end-to-end and provide an electrical connection with the drill string. These approaches complicate make-up operation and could comprise EM tool functionality. Use of spacers may require disassembly and reassembly with spacers of a different thickness to achieve alignment. Bayonet connectors accommodate little variance in distance and are subject to infiltration of fluids. Shafts with fixed attachment points are prone to breaking. Telescoping electrode shafts, for instance, are less reliable during drilling due to the penetration of drilling mud solids which may hinder their operation during drilling.

SUMMARY

An embodiment of the present disclosure includes a drilling system, method and associated drill string components. The embodiment includes a method for assembling a drill string including an electromagnetic (EM) tool, the drill string when assembled is configured to drill a borehole in an earthen formation and is elongate along a longitudinal direction. The EM tool has an uphole portion and a downhole portion. The method includes positioning a first drill string component relative to a second drill string component along the longitudinal direction, the first drill string component having an electric contact assembly configured to slidably receive an uphole portion of the EM tool. The downhole portion of the EM tool is supported by the second drill string component. The method also includes placing a portion the of EM tool in contact with the electric contact assembly so as to define an electrical connection between the portion of the EM tool and the first drill string component. The electric contact assembly is configured to permit the EM tool to move relative to the first drill string component while maintaining the electrical connection between the portion of the EM tool and the first drill string component.

Another embodiment of the present disclosure includes a drill string component assembly for a drilling system. The drill string component assembly includes an electromagnetic (EM) telemetry tool that includes an electrode assembly, a transmission assembly configured for electrical connection to the electrode assembly, and an electric contact assembly.

The electric contact assembly includes an electric contact body and at least one conductive biasing element carried by the contact body. The electric contact body includes an outer surface, an opposed inner surface, and a throughhole that extends along the inner surface, the throughhole sized to receive a portion of electrode assembly. The conductive biasing element at least partially defines the throughhole and the at least one conductive biasing element configured to define an electrical connection between the received portion of the electrode assembly and the contact body. The electric contact assembly is configured to permit the received portion of the EM tool to move in the throughhole while maintaining the electrical connection between the received portion of the EM tool and the electric contact body during assembly of the drill string at a drill site.

Another embodiment of the present disclosure is an electric contact assembly configured to electrically connect an electromagnetic (EM) tool to a portion of a drill string configured to drill a borehole in an earthen formation. The electric contact assembly includes an electric contact body including an outer surface, an opposed inner surface, and a throughhole that extends along the inner surface, the outer surface configured to fixedly attach to an internal surface of the drill string, the throughhole sized to receive a portion of the EM tool. The contact assembly also includes at least one conductive biasing element carried by the inner surface of the electric contact body so as to at least partially define the throughhole. The at least one conductive biasing element is configured to define an electrical connection between the received portion of the EM tool and the contact body. The electric contact assembly is configured to permit the received portion of the EM tool to move in the throughhole while maintaining the electrical connection between the received portion of the EM tool and the electric contact body.

Another embodiment of the present disclosure includes a drilling system configured to define a borehole in an earthen formation. The drilling system includes a drill string elongate along a longitudinal axis and having an uphole end, a downhole end spaced from the uphole end along the longitudinal axis, and drill bit carried by the downhole end. The drilling system includes an electric contact assembly attached to the drill string. The electric contact assembly includes an electric contact body including an outer surface, an opposed inner surface, and a throughhole that extends along the inner surface. The electric contact assembly includes at least one conductive biasing element carried by the inner surface of the contact body so as to at least partially define the throughhole. The drilling system also includes an EM telemetry tool in passage and attached to the drill string. The EM telemetry tool includes a top portion and a bottom portion spaced from the top portion toward the downhole end of the drill string, the throughhole configured to moveably receive the top portion of the EM telemetry tool. The at least one conductive biasing element is configured to define a moveable electrical connection between the top portion of the EM tool and the drill string.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Figure 1A:
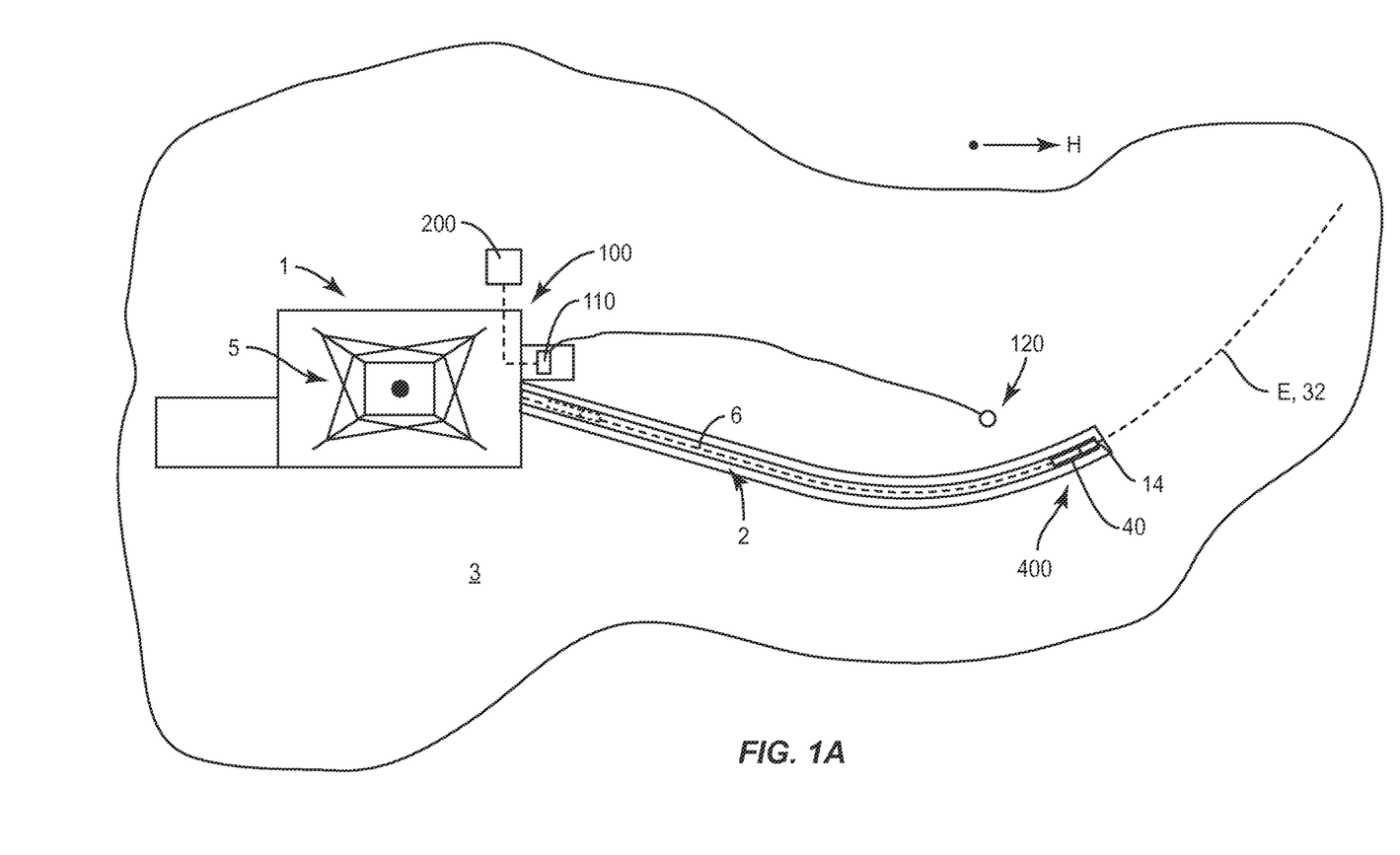
FIG. 1A is a schematic plan view of a drilling system and a drill string configured to form a borehole in an earthen formation, according to an embodiment of the present disclosure.
Figure 1B:
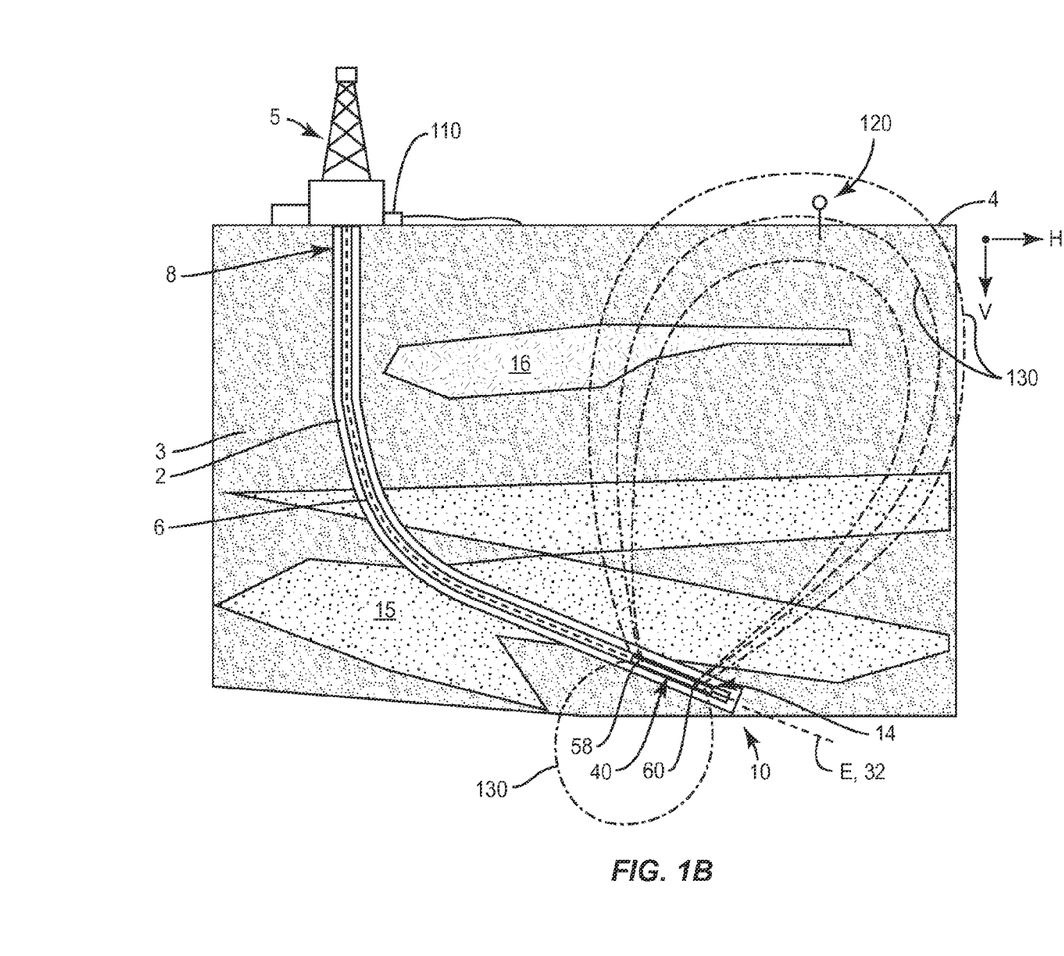
FIG. 1B is a schematic side view of the drilling system and drill string shown in FIG. 1A.
Figure 1C:
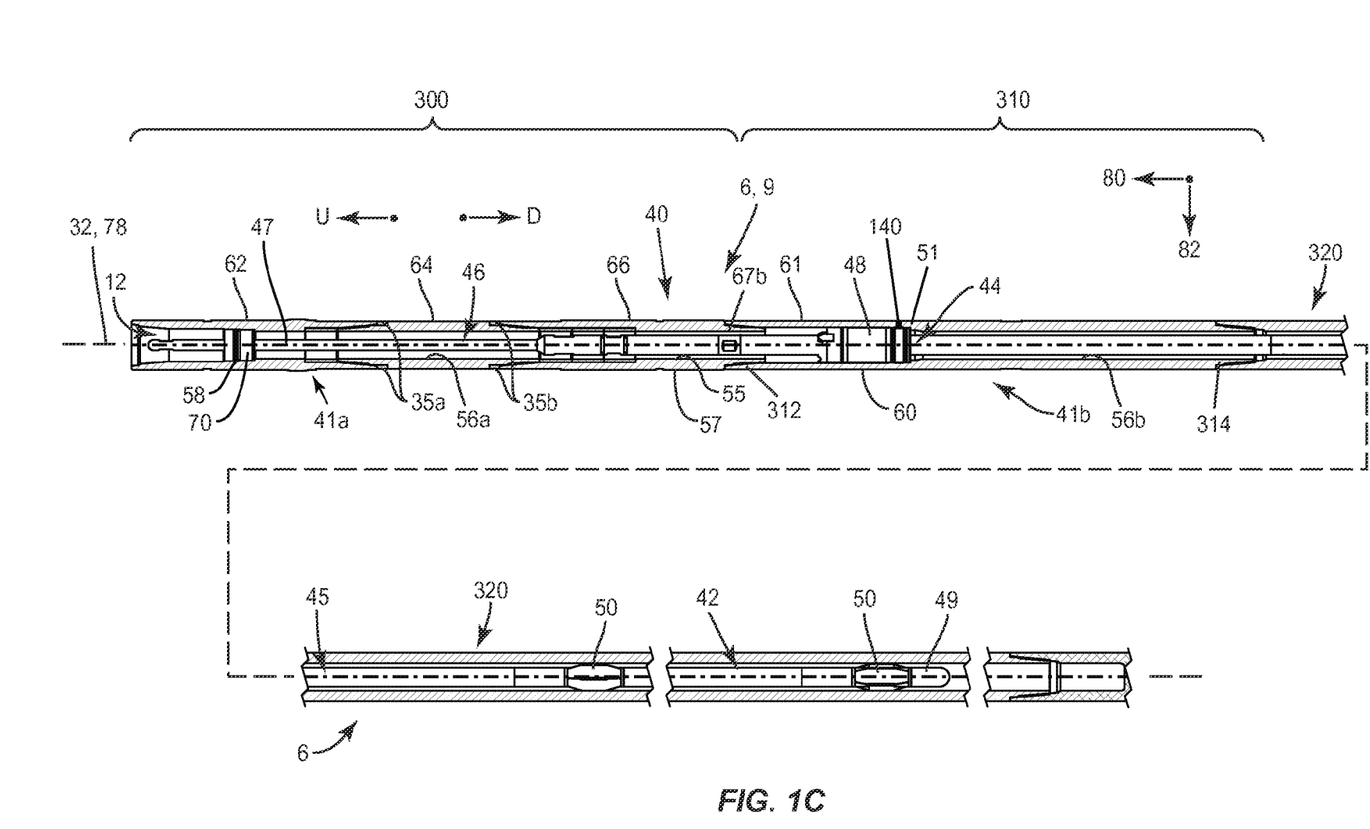
FIG. 1C is a sectional view of a portion of the drill string and an EM telemetry tool fix mounted to the drill string shown in FIG. 1A.

Referring to FIGS. 1A-1C, an embodiment of the present disclosure is drilling system 1 including a drill string 6 and drill bit 14 configured to drill a borehole 2 in an earthen formation 3 during a drilling operation. In addition, the drilling system 1 includes an EM telemetry assembly 400 that includes an EM telemetry tool 40 connected to one or more drill string components located at a downhole end of the drill string 6. The EM telemetry assembly 400 is configured to transmit drilling data to the surface as will be further detailed below. The EM telemetry assembly 400 includes an EM tool 40 and one or more drill string components, for instance a gap sub assembly 300 and flow sub 310 (FIG. 1C), and an electric contact assembly 70 (FIG. 1C). The electric contact assembly defines an electronic connection between an uphole portion of the EM telemetry tool 40 and the drill string 6. In particular, the electric contact assembly 70 is configured such that the uphole portion of the EM tool 40 can slide along the electric contact assembly 70 during a make-up operation. Because, during the make-up operation, the EM telemetry tool 40 can slide along the electric contact assembly 70 and is thus moveable relative to the gap sub assembly 300, any needed adjustment or modification to the ends of the gap sub assembly 300 and flow sub 310 that connect to each other is minimized if not avoided altogether. For instance, one or more of the gap sub assembly 300 and flow sub 310 may be damaged due to prior use such that new threaded connections were added or certain portions were removed changing the length accordingly prior to assembly at the drill site. The EM telemetry assembly 400 as described herein permits use of drill string components of varying lengths during a makeup operation without affecting the integrity of the drill string 6 or EM tool 40 or electrical connection. The result is a simpler method for drill string assembly at the drill site. In addition, drill string 6 and EM tool 40 attachments, both mechanical and electrical, are more reliable, thus improving EM telemetry reliability during the drilling operation.

Continuing with FIGS. 1A and 1B, according to the illustrated embodiment, the drilling system 1 is configured to drill the borehole 2 in an earthen formation 3 along a borehole axis E such that the borehole axis E extends at least partially along a vertical direction V. The vertical direction V refers to a direction that is perpendicular to the surface 4 of the earthen formation 3. It should be appreciated that the drill string 6 can be configured for directional drilling, whereby all or a portion of the borehole 2 is angularly offset with respect to the vertical direction V along a horizontal direction H. The horizontal direction H is mostly perpendicular to the vertical direction V so as to be aligned with or parallel to the surface 4. The terms "horizontal" and "vertical" used herein are as understood in the drilling field, and are thus approximations. Thus, the horizontal direction H can extend along any direction that is perpendicular to the vertical direction V, for instance north, east, south and west, as well as any incremental direction between north, east, south and west. Further, downhole or downhole location means a location closer to the bottom end of the drill string 6 than the top end of the drill string 6. Accordingly, a downhole direction D (FIG. 1C) refers to the direction from the surface 4 toward a bottom end (not numbered) of the borehole 2, while an uphole direction U (FIG. 1C) refers to the direction from the bottom end of the borehole 2 toward the surface 4. The downhole and uphole directions D and H can be curvilinear for directional drilling operations. Thus, the drilling direction or well path extends partially along the vertical direction V and the horizontal direction H (FIG. 1B) in any particular geographic direction as noted above. An expected drilling direction refers to the direction along which the borehole will be defined in the earthen formation 3.

Continuing with FIGS. 1A-1C, the drilling system 1 includes a derrick 5 that supports the drill string 6 that extends through a casing (not numbered). The drill string 6 is elongate along a central longitudinal axis 32 and includes a top end 8 and a bottom end 10 spaced from the top end 8 along the central longitudinal axis 32. The drill string 6 also extends along a longitudinal direction 80 that is aligned with the central longitudinal axis 32. The drill string 6 includes multiple drill string components that define the drill string 6 and the internal passage 12 (FIG. 1C) through which drill mud travels in a downhole direction D. Drill string components include drill pipe and a bottomhole assembly (BHA) which includes one or more subs, stabilizers, drill collars, and a drill bit 14 that define the drill string 6. One or more of the drill sting components can be defined by the multiple drill string components connected end-to-end along the central longitudinal axis 32 with a drill bit 14 positioned at the bottom end 10 of the drill string 6. One or more motors, such as a top drive or rotary table, are configured to rotate the drill string 6 so as to control the rotational speed (RPM) of, and torque on, the drill bit 14. The one or more motors (not shown) can rotate the drill string 6 and drill bit 14 to define the borehole 2. A pump is configured to pump a fluid (not shown), for instance drilling mud, drilling with air, foam (or aerated mud), downward through the internal passage 12 (FIG. 1C) in the drill string 6. When the drilling mud exits the drill string 6 at the drill bit 14, the returning drilling mud flows upward toward the surface 4 through an annular passage 13 (FIG. 1B) formed between the drill string 6 and a wall (not numbered) of the borehole 2 in the earthen formation 3. Optionally, a mud motor may be disposed at a downhole location of the drill string 6 to rotate the drill bit 14 independent of the rotation of the drill string 6.

As shown in FIGS. 1A and 1B, the drilling system 1 can include one or more computing devices 200 in electronic communication with EM telemetry system 100. The EM telemetry system 100 includes a receiver assembly 110 and antenna stake(s) 120 (only one shown). The EM telemetry system 100 is configured to produce, detect, and process an electromagnetic field signal 130. The computing device 200 is configured to receive, process, and store various drilling operation information, such as directional, formation information obtained from the downhole sensors described above.

Referring to FIGS. 1C-2B, as noted above, the drill string 6 includes several drill string components 300, 310 and 320 that define a portion 9 of the drill string 6 and support the EM telemetry tool 40. The first drill string component 300 is positioned along the longitudinal axis 32 relative to the second drill component 310 and the third drill string component 320. The drill bit 14 is attached to a downhole end of the third drill string component 320. Any pair of the first, second, and third drill string components can be configured so that when assembled, there is defined at least one electrical discontinuity along one or more of the first and second drill string components, as well we discussed below. Each drill string component includes an inner surface 55, an opposed outer surface 57, and a passage 12 defined by the inner surface 55. Further, opposing ends of each drill string component can include or define connection members, such as threads, configured to allow adjacent drill string components to be fixedly attached to each other during make-up, as will be further detailed below.

Figure 2A:
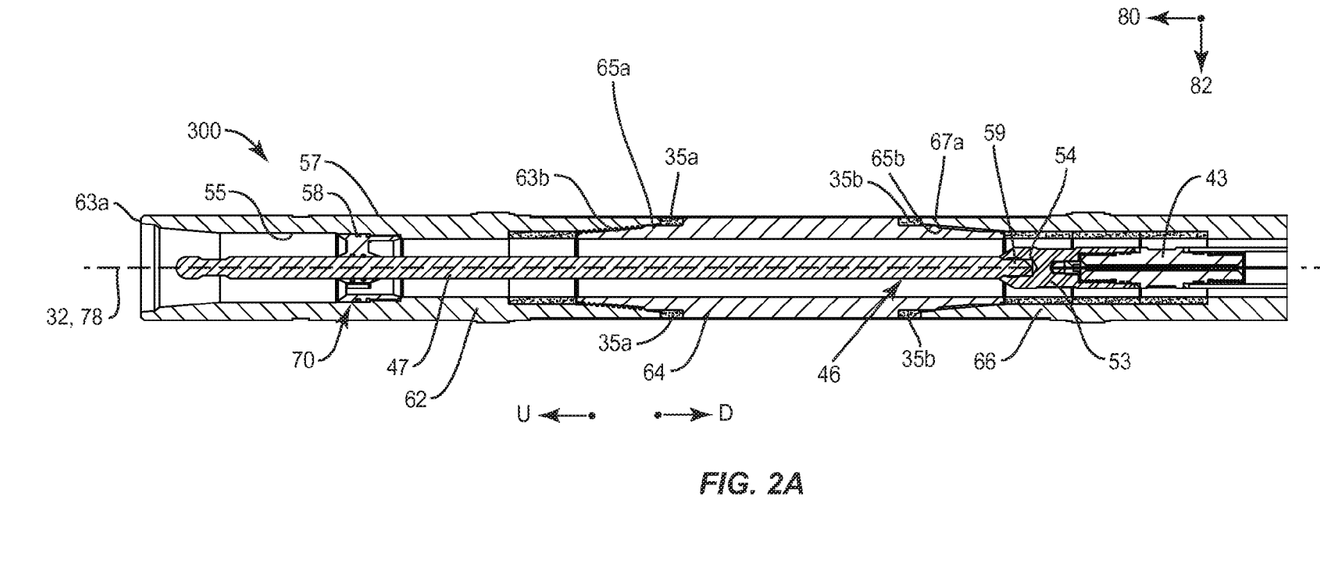
FIG. 2A is a detailed sectional view of a portion of the drill string telemetry tool shown in FIG. 1A.
Figure 2B:
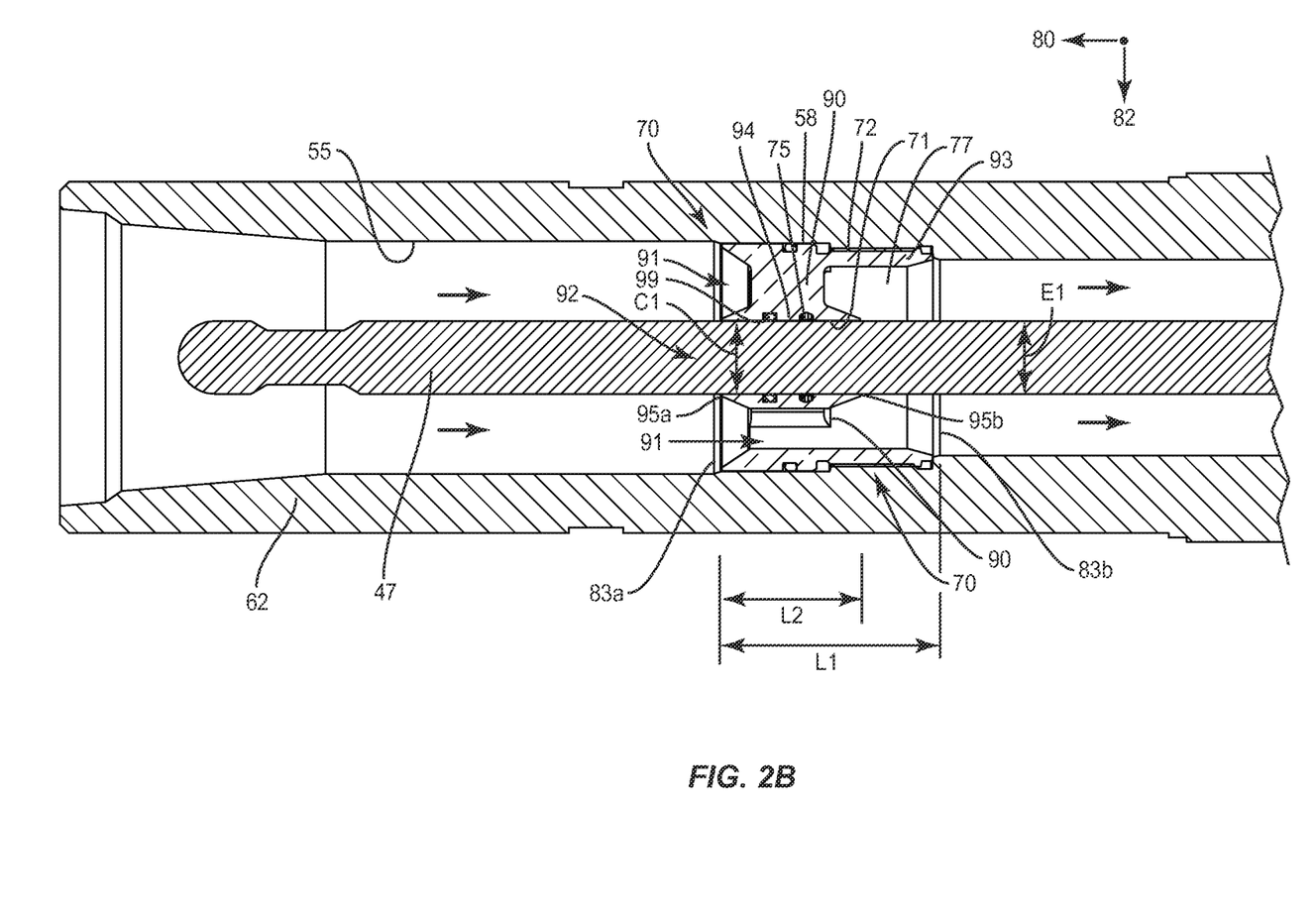
FIG. 2B is a detailed sectional view of a portion of the drill string shown in FIG. 2A.

The first drill string component 300 and the second drill string component 310 are configured to define at least one electrical discontinuity along the first and second drill sting components when assembled together. The electrical discontinuity refers to a portion of drill string components that will not conduct a current therethrough. Thus, the electrical discontinuity can include a portion of all of the gap sub assembly 300. Further, the electrical discontinuity could be an electrical insulator.

In accordance with the illustrated embodiment, For instance, the first drill string component is the gap sub assembly 300, the second drill string component is a flow sub 310, and the third drill string component can be one or more drill collars 320. The gap sub assembly can include an inner surface 56a and the flow sub can include an inner surface 56b (see FIG. 1C). The inner surfaces 56a and 56b can define a portion of the drill string inner surface 55. Thus, the inner surfaces 56a and 56b are sometimes used interchangeable with inner surface 55. The gap sub assembly 300 and the flow sub 310 are each configured to support the EM telemetry tool 40. Thus, the EM telemetry assembly 400 can include the gap sub assembly 300, the flow sub 310 and the EM telemetry tool 40. Each of the drill string components will be described next.

As shown in FIGS. 1C and 2A, the gap sub assembly 300 can include a first gap sub component 62, a first insulator 35a, a second gap sub component 64, a second insulator 35b and a third gap sub component 66. Gap sub components 62, 64, 66 and insulators 35a, 35b define a "dual gap sub" configuration as should be appreciated by a person of skill in the art. The gap sub component 62 includes a first end 63a and an opposed second end 63b. The second gap sub component 64 includes a first end 65a and an opposed second end 65b. The third gap sub component 66 includes a first end 67a and an opposed second end 67b (FIG. 1C). The second end 63b of the first drill gap sub component 62 can be connected to the first end 65a of the second gap sub component 64, and the second end 65b of the second drill gap sub component 64 can be attached to the first end 67 of the third gap sub component 66. End 63a defines a first or uphole end (not numbered) of the gap sub assembly 300 and end 67b defines a second or downhole end (not numbered) of the gap sub assembly 300.

Continuing with FIGS. 1C and 2A, the flow sub 310 is configured to support a portion of the EM tool 40. The flow sub 310 includes a flow sub body 61 a first or uphole end 312 and a second or downhole end 314. When the drill string 6 is assembled, the downhole end 314 of the flow sub 310 is mounted to the drill collar 320. The downhole end 67*b* of the gap sub assembly 300 is mounted to the uphole end 312 of the flow sub 310. As noted above, a dual gap sub 300 is shown connected directly to the flow sub 310. The inner surface 56*b* of the flow sub 310 is configured to attach to a portion of the EM tool 40, as further detailed below.

Several up to all of the adjacent drill string components described above can include insulators 35*a* positioned between adjacent ends of the drill string components. In accordance with the illustrated embodiment, the threaded connections between gap sub assembly 300 and the flow sub 310 include insulators. The insulators prevent current from passing along the drill string 6 between various electrical connections used to create the EM field as further detailed below.

While dual gap sub assembly 300 configuration is shown and referred to in this description for purposes of explaining how the EM tool 40 is connected to the drill string portion 9, it should be appreciated that the description herein would apply to a single gap sub configuration and/or a configuration where the gap sub or subs are not connected directly to the flow sub. Further, the drill string 6 could also include additional intervening drill components between the gap sub assembly 300 and the flow sub 310. For instance, additional subs or drill collar sections can be placed between the gap sub assembly 300 and flow sub 310 depending on the design of the EM telemetry system. Additional uphole or downhole drill string components can be used to define the drill string 6 as drilling progresses into the formation as is typical in a drilling operation. For instance, additional drill collar sections can be added between the flow sub and drill bit (not shown). Further, any reference to "first" "second" and "third" . . . drill components is used herein for the purpose of illustrating embodiments of the present disclosure and should be limiting. Therefore first, second, third, etc. drill component can refer to the gap sub or gap sub components, the flow sub, drill collar sections, or any other drill string components.

Turning to FIGS. 1C through 2A, the EM telemetry tool 40 is attached to the drill string 6 and spans multiple drill string components 300, 310 and 320. The EM telemetry tool 40 is sometimes referred to herein as a measurement-while-drilling (MWD) tool, although the EM telemetry tool 40 could also be logging-while-drilling (LWD) type tool. The EM telemetry tool 40 may be electrically connected to one or more sensors 42 that obtain drilling data. As noted above, the EM telemetry tool 40 is configured to transmit drilling data to the surface 4 (FIG. 1B) via an electromagnetic signal generated by the EM telemetry tool 40. Thus, the EM telemetry tool 40 can also be referred to as an EM transmitter.

In the illustrated embodiment, the EM telemetry tool 40 is a fixed mount tool. The EM tool 40 is connected to the drill string 6 at an attachment location defined by the flow sub 310. The EM telemetry tool 40 includes a transmission assembly 44, a power source 45, an electrode assembly 46, an electrode insulator 43 (FIG. 2A), and a housing 48 that supports a portion of transmission assembly 44. The electrode insulator 43, commonly referred to as an electrode gap, can be located where the electrode assembly 46 is attached to the transmission assembly 44. The EM telemetry tool 40 can be supported in the drill string 6 by the housing 48, which may be referred to as a centralizer. During make-up as, the housing 48 is mounted to the inner surface 55 of the drill string 6, for instance the inner surface 56*b* of the flow sub, and may define a downhole mount location 140. The inner surface 56*b* of the flow sub body 61 includes a lip 51 that extends toward the central longitudinal axis 32 and circumferentially around the inner surface 56*b* of the flow sub 61. The downhole end (not numbered) of the housing 48 rests upon and is attached to the lip 51 so that the EM tool 40 is suspended in the drill string internal passage 12. The power source 45 and electronics package extends from the housing 48 toward an EM tool terminal end 49 in the downhole direction D. The EM tool 40 includes various spaced apart centralizers 50 that position the EM tool 40 along the central axis 32.

The illustrated configuration is referred to in the art as a top-mount EM tool. However, the EM tool 40 can be configured as a bottom-mount EM tool. For a bottom-mount EM tool, the housing 48 is positioned downhole relative to the sensors 42. The bottom-mount EM tool 40 would seat into the flow sub 310 and support uphole portions of the EM tool 40. The disclosure thus includes both top and bottom mount EM tools. While the preferred embodiment is fixed mount type EM tool 40, the electrical contact assembly 70 could also be used with the retrievable type EM tools as needed.

When the EM telemetry tool 40 is attached to the drill string 6, the EM tool 40 can define the first electrical connection 58 with the drill string 6 and a second downhole electrical connection 60 that is spaced from the first electrical connection 58 along the central longitudinal axis 32 along the downhole direction D. The electric discontinuity discussed above can be located somewhere between the first electrical connection 58 and the second downhole electrical connection 60 The electric contact assembly 70 defines the first, for instance an electric connection 58 between the EM tool 40 and the drill sting 6. In the illustrated embodiment, the first electrical connection 58 is with the gap sub assembly 300, as will be further detailed below. It should be appreciated that the first electrical connection 58 can be with the drill string 6 at location uphole relative to the gap sub assembly 300. The housing 48 can define the second electrical connection 60 with the flow sub 310, as well as the mount location 140, as noted above. As illustrated, the housing 48 can include a conductive element that defines the second electrical connection 60 with the flow sub 310 of the drill string 6. Thus, the first electrical connection 58 can be referred to as an uphole electrical connection while the second electrical connection 60 can be a downhole electrical connection. However, in certain embodiments, the housing 48 may be attached to the flow sub 320 to define the mount location 140 while a conductive element can connect a downhole portion of the EM tool 40 to the flow sub 310 so as to define the second electrical connection 60. Thus, it should be appreciated that the second electrical connection 58 is not necessarily defined by or located at the same location as the downhole mount location 140.

When the EM telemetry tool 40 is installed in the drill string 6 or part of the BHA and used during a drilling operation, the EM telemetry tool 40 extends along and with a portion of the gap sub assembly 300. The gap sub assembly 300 electrically isolates an uphole portion of the drill string 6, where the first electrical connection 58 is defined, from a downhole portion of the drill string 6, where the second electrical connection 60 is defined. The gap sub assembly 300 can thus include an upper gap sub portion (not numbered) and a lower gap sub portion (not numbered) separated from the upper gap sub portion by the insulators 35*a*, 35*b*. The first electrical connection 58 is typically referred to in the art as a "gap plus" and the second electrical connection 60 is typically referred to in the art as the "gap minus." While a dual gap sub assembly 300 gap is shown, the gap sub assembly can be a single gap sub. Regardless, the mating surfaces of gap sub components can be insulated. Typically, the threads and shoulders are insulated, but any means which electrically isolates a portion of the drill string 6 can be used.

Turning to FIGS. 2A and 2B, the electrode assembly 46 includes an electrode base 53 coupled to the electrode insulator 43 and a shaft 47 that extends from the electrode base 53 along the uphole direction U. The shaft 47 is slidably connected to the electric contact assembly 70, as further detailed below. The shaft 47 includes a downhole end 59 that is threadably connected in a threaded bore 54 of the electrode base 53. The electrode shaft 47 may also be directly connected to the electrode insulator 43 without the use of a base 53. The electrode insulator 43 can include an interface for defining a wired connection to the transmission assembly 44, power source 45, and electrode shaft 47. The shaft 47 and base 53 are configured for separation and re-coupling as needed during make-up.

Returning to FIG. 1C, the power source 45, which can be a battery or turbine alternator, supplies current to the transmission assembly 44, the electrode assembly 46, and sensors 42. The power source 45 is configured to induce a charge, or voltage across the drill string 6, between 1) the first electrical connection 58 defined by the electrode assembly 46 in contact with the contact assembly 70 and the gap sub assembly 67 above the insulators 35a and 35b, and 2) the second electrical connection 60 with the flow sub 310 located below the gap sub assembly 300. When the power source 45 supplies a charge to the electrode assembly 46, the electrode shaft 47 conducts current to the first electrical connection 58 located above the insulators 35a, 35b in the gap sub assembly 300. The electrode insulator 43 includes a passageway (not shown) that permits the delivery of current to the electrode shaft 47. Further, the electrode insulator 43 is configured to block the current delivered to the electrode shaft 47 from flowing back into the transmission assembly 44. When the power source 45 induces the charge, the charge creates the electromagnetic field signal 130 (FIG. 1B). The electric field component becomes positive or negative by oscillating the charge, which creates and causes an electromagnetic field signal 130 to emanate from the EM telemetry tool 40.

In this regard, the transmission assembly 44 receives drilling data from the one or more sensors 42 and encodes the drilling data into a data packet. The transmission assembly 44 also includes a power amplifier (not shown) electrically connected to a modulator (not shown). The modulator modulates the data packet into the electromagnetic signal 130 created by the voltage induced across the EM telemetry tool 40 between the first and second electrical connections 58 and 60. It can be said that the data packet is embodied in the electromagnetic field signal 130. The power amplifier amplifies the voltage induced across the EM telemetry tool 40. In particular, the power amplifier (not shown) amplifies the electrical field component of the electromagnetic signal 130 such that electric field component of the signal 130 can propagate through the formation 3 and formation strata (15, 16) to the surface 4 and is received by an antenna 120.

Turning to FIGS. 2A and 2B, the electric contact assembly 70 may be attached to the drill string 6 so as to define the electrical connection 58 with the drill string 6 during make-up. In the depicted embodiment the contact assembly 70 is attached to the inner surface 55 of the drill string 6 so as to define the electrical connection 58. For instance, the electric contact assembly 70 is mounted to the inner surface 56a of the gap sub assembly 300, such as the first gap sub component 62. In alternative embodiments, the contact assembly 70 could be mounted to a drill string component that is located uphole from the gap sub assembly 300. While the electric contact assembly 70 is shown mounted to the inner surface 56a of the gap sub assembly 300, in alternative embodiments the contact assembly 70 could be mounted to the outer surface of the drill string 6.

The electric contact assembly 70 includes at least one conductive biasing element 75 that defines the electric connection between a portion of the EM tool 40, such as the electrode shaft 47, and the drill string 6. The connection between the contact assembly 70 maintains conductive electrical contact with the drill string 6 while also providing for assembly flexibility. The inner contact surface 71 (FIG. 3) of the contact assembly 70 defines a throughhole 92 (FIG. 3) that slidably receives the electrode shaft 47. The connection between the contact assembly 70 and the electrode shaft 47 defines the electrical connection 58 with the drill string 6. The electrode shaft 47 can slide through throughhole 92 during makeup, for instance, to accommodate differences in drill string components lengths or connections without having to modify drill string component lengths or connections with spacers or such. If drill string component lengths or connections need to be modified prior to or during assembly at the drill site, the shaft 47 can slide through the through the hole 92 until the shaft 47 is connected to the base 43 mounted to the flow sub 140 at or near the mount location 140. Thereafter, when the drill string components are attached, the electrode shaft 47 is held in position and does not move relative to the conductive biasing element 75. Further, an electrical connection is maintained between the shaft 47 and the gap sub assembly 300. Preferably the contact assembly 70 is threaded into the inner surface of the gap sub assembly 300. However, in alternative embodiments, the contact assembly 70 may be mounted to the gap sub assembly 300 by fasteners, adhesives or other mounting means.

In the embodiment illustrated in FIGS. 2A and 2B, the electric contact assembly 70 is attached to the first drill string component, for instance to the inner surface 56a of the gap sub assembly 300. Typically, where the uphole portion of the EM tool 40 is mounted to the drill string 6 is a fixed point as noted above. In accordance with the present disclosure, the contact assembly 70 may be fix mounted to the inner surface 56a of the gap sub assembly 300. The location where the contact assembly 70 is mounted to the inner surface 56a of the gap sub assembly 300 may be considered an uphole mount location (not numbered). The downhole portion of the EM tool 40 is supported by a drill string component 310, for instance the flow sub, at the downhole mount location 140. After make-up, the electrode shaft 47 extends to the gap sub assembly 300 and through the contact assembly 70, thereby defining the electrical connection 58 between the electrode assembly 46 and the drill string 6. The connection between the electric contact assembly 70 and the electrode assembly 46 can accommodate any variance in distance between a) the first electrical connection 58 of gap sub assembly 300 (which would be an uphole mount location in prior drill string systems) and b) the downhole mount location 140 that is due to modification or replacement of intervening the gap and/or flow sub components. As noted above, the drill string components that comprise the gap sub assembly 300 and flow sub 310 are mixed and reused from drilling one well to another and vary in length due to manufacturing tolerances, wear and material removed or modified during repairs. Because the gap sub assembly 300 and flow sub 310 when assembled do not have a consistent combined length from one make-up operation to the next, the distance between uphole mount location contained within the gap sub assembly 300 and downhole mount location contained in flow sub 310 is not consistent when assembled. Accordingly, the distances between uphole mount location and downhole mount location 1) between the EM tool 40 and the drill string 6, and 2) among the gap and flow sub components, must be realized and accommodated during make-up to the specified distance resulting during that particular make up. In accordance with the present disclosure, however, because the shaft 47 is moveable relative to electric contact assembly 70 during make-up, any modifications to the components of the gap sub and flow sub that change component lengths or changed connections can be easily accommodated. Once the downhole mount location 140 is established with the flow sub 310, any modification to intervening sub components, or any variance in sub component configuration from the drill string design at the location between the first and second electrical connections 58 and 60, does not impact the location or stability of the uphole electrical connection 58 between the electrode shaft 47 and the gap sub assembly 300. In other words, because the electrode shaft 47 is slidable relative to and along the gap sub assembly 300, worn subs or drill string components can replaced with subs or drill string components of slightly varying length. Different length shafts can also be used to easily accommodate a wider range of distances.

Figure 3:
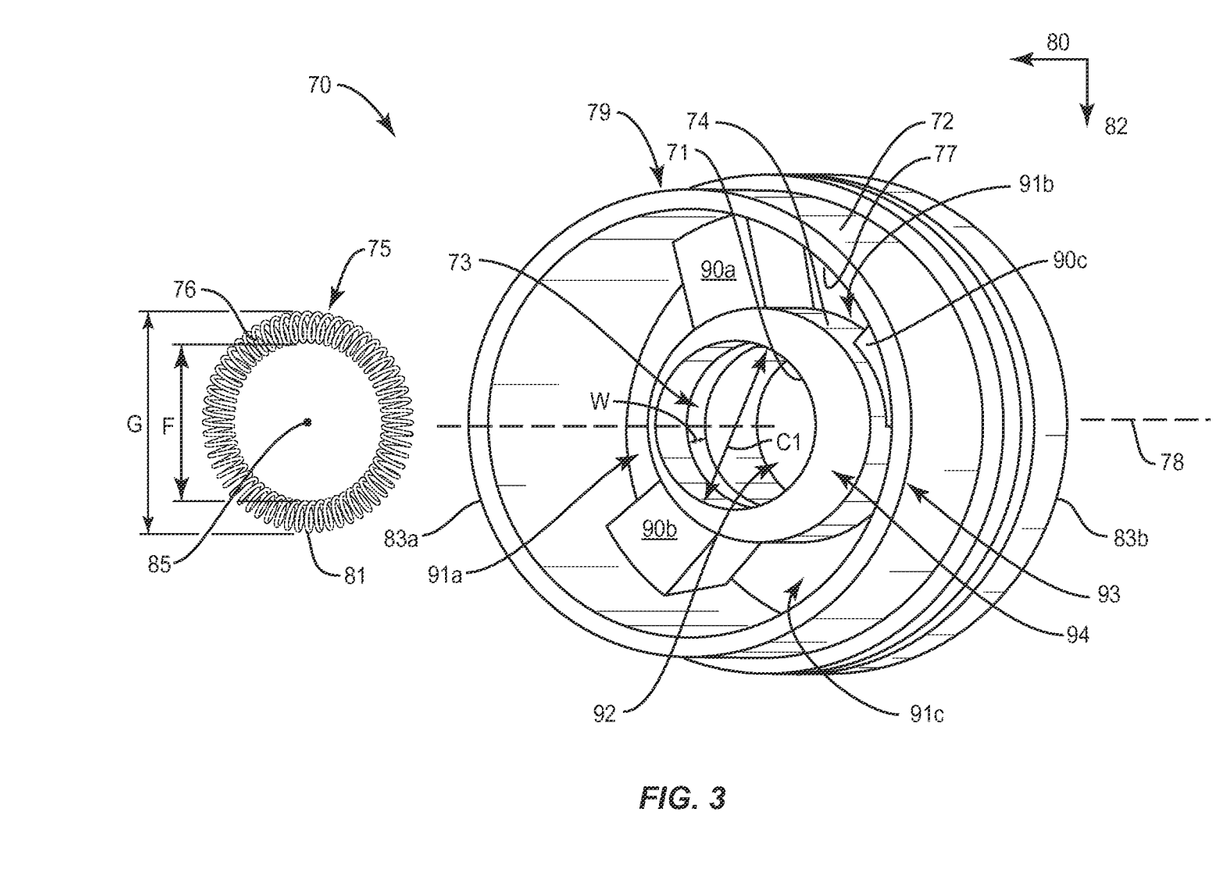
FIG. 3 is a perspective view of an electric contact assembly in the drill string shown in FIGS. 2A and 2B.

Referring to FIGS. 2B and 3, the contact assembly 70 may be configured to define the electrical connection 58 (FIG. 2B) between the EM tool 40 and the drill string 6, and in particular the gap sub assembly 300. The electric contact assembly 70 includes a contact body 79 and the at least one conductive biasing element 75. The contact body 79 can define a ring shape that extends along a contact body central axis 78 between opposed ends 83a and 83b. When the electric contact assembly 70 is attached to the inner surface 55 of the drill string 6, the longitudinal axis 32 of the drill string 6 is coaxial with the contact body central axis 78. In addition, the contact body 79 defines a throughhole 92 that extends along the central axis 78. The throughhole 92 is sized and configured to receive a portion of the EM tool 40, for instance, the electrode shaft 47 therein. The conductive element 75 is carried by the contact body 79 such that the contact body and the conductive element 75 defines at least a portion of the throughhole 92. While contact assembly 70 is shown as being coaxial with the longitudinal axis 32, the contact assembly 70 can be configured such that the throughhole 92 is offset with respect to the longitudinal axis 32.

The contact body 79 includes an outer wall 93 and an inner contact wall 94 that is spaced from the outer wall 93 by a plurality of connection members 90a, 90b, and 90c along a radial direction 82 that is perpendicular to the central axis 78 (or longitudinal axis 32). The outer wall 93 attaches to the inner surface 55 of the drill string 6 and the inner wall 94 defines the throughhole 92 that receives the electrode shaft 47. The connection members 90a, 90b, and 90c, which can be referred to as struts, are electric conductors that allow for current to pass from the inner contact wall 94 to the outer contact wall 93.

Continuing with FIGS. 2B and 3, the outer wall 93 is configured to be attached to the inner surface 55 of the drill string 6. In the illustrated embodiment, the outer wall 93 is threaded. The corresponding inner surface 56a of the gap sub component 62 is threaded so as to threadably engage the outer wall 93 of the contact body 79. The outer wall 93 includes an outer contact surface 72, which defines the outer surface of the contact assembly 70, and an opposed inner surface 77 spaced from the outer contact surface 72 along the radial direction 82. The inner contact wall 94 defines an outer surface 74 and an opposed inner contact surface 71. The inner contact surface 71 of the inner wall 94 defines the throughhole 92. The inner contact surface 71 defines a throughhole cross-sectional dimension C1. The throughhole cross-sectional dimension C1 is perpendicular to and intersects the central axis 78. Further, the throughhole cross-sectional dimension C1 extends from a point (not shown) on the inner contact surface 71 to an opposed point (not shown) on the inner contact surface 71. As illustrated, the inner contact surface 71 of the inner contact wall 94 is opposed to the outer contact surface 72 of the outer wall 93 along the radial direction 82. The outer wall 93 can extend along the central axis 78 to define a first length (L1) that extends from the first end 83a to the second end 83b. The inner wall 94 includes first and second opposed ends 95a and 95b. The inner wall can have a second length L2 that extends from first end 95a to the second opposed end 95b along the central axis 78. In the illustrated embodiment, the length L2 is less than the length L1. It should be appreciated that the second length L2 can be less than the first length L1, equal to the first length L1, or greater than the first length L1.

Turning to FIG. 3, the inner contact surface 71 is configured to carry the at least one biasing conductive element 75. In the illustrated embodiment, the inner contact surface 71 defines at least one recess 73 that is sized to receive a portion of a respective at least one conductive element 75 therein. The conductive element 75 is configured to fit into the recess 73 so that the inner contact surface 71 and the conductive element 75 at least partially define the throughhole 92. Further, the recess 73 extends 1) into the contact body 79 along the radial direction 82 to define a recess depth (not shown) along the radial direction 82, and 2) along the central axis 78 to define a recess width W that is perpendicular to the depth. The recess 73 is illustrated as having a width W that is less than the length L2 of the inner wall 94. The inner wall 94, or recess 73, can be sized so that the recess width W is slightly less than the length L2 of the inner wall 94. For instance, the inner wall 94 can have the length L2 sufficient to define the recess 73 for receiving the conductive element 75 therein. An o-ring 99 or rings can be located in a similar recess formed in the contact body 79 in an uphole direction U from the conductive element 75. The o-ring 99 can protect the conductive element 75 from infiltration of drilling mud during the drilling operation.

Continuing with FIGS. 2B and 3, according to the illustrated embodiment, the contact body 79 is configured to permit drilling mud to pass therethrough. The outer wall 93, inner wall 94, connection members 90a, 90b, and 90c define a plurality of respective passages 91a, 91b, and 91c. The passages 91a-91c that permit drilling mud (not shown) to pass through the electric contact assembly 70 toward the drill bit 16 (not shown) along the downhole direction D. While three connection members 90a-90c and three corresponding passages 91a-91c are illustrated, the contact body 79 can include more than three or less than three connection members. In accordance with an alternative embodiment, the contact body 79 can be constructed to extend from outer contact surface 72 to the inner contact surface 71. In such an alternative embodiment, instead of connection members 90a, 90b, and 90c, the contact body 79 includes a plurality of channels (not shown) that extend from one end 83a of the contact assembly to the opposed end 83*b* of the contact assembly 70 so to define passages through which the mud can flow toward the drill bit.

The contact body 79 can be formed of monolithic conductive material, such as stainless steel alloys. In alternative embodiments, the contact body 79 can be formed of separate parts assembled together. For instance, the outer wall 93, inner wall 94, connection members 90*a*, 90*b*, 90*c* can be formed separately and assembled together.

Turning to FIG. 3, the conductive element 75 is an electrically conducting biasing element that is configured to radially expand and compress as needed to maintain contact with the electrode shaft 47 during assembly operations, while maintaining equal pressure between the contact assembly 70 and the electrode shaft 47. The conductive element 75 is formed of a coiled conductive member 76 with opposed ends (not shown) connected together to define a generally circular biasing member having a center 85. The conductive element 75 can define an opening with a center 85 that is coaxial with the central axis 78 when the placed in the recess 73. The conductive element 75 is thus coiled about an axis (not shown) that extends around the center 85 along with a periphery 81 of the conductive element 75 so that the conductive element 75 can be radially expanded or radially compressed. The opening can receive the electrode shaft 47 as noted above.

As shown in FIGS. 2A and 3, the conductive element 75 is sized and configured to maintain electrical contact between the EM tool 40 and the contact body 79 and thus the drill string 6. For instance, the conductive element 75 defines an element inner cross-sectional dimension F (FIG. 3) that is perpendicular to and passes through the center 85. The conductive element 75 also defines an outer element cross-sectional dimension G (FIG. 3) that is perpendicular to the axis 78 that passes through the center 85 between opposing points along an outer periphery 81 of the conductive element 75. Radial expansion or compression can cause independent or near simultaneous increase or decrease of the respective outer and inner element cross-sectional dimensions F and G. This allows the conductive element 75 to fit in and be retained in the recess 73 while also allowing the conductive element 75 to radially expand so as to receive the electrode shaft 47. For instance, the element inner cross-sectional dimension F can be greater when radially expanded to receive the shaft 47 compared to when the conductive element 75 is unbiased and positioned in the recess 73. As noted above, the inner surface 71 defines a throughhole cross-sectional dimension C1 (FIG. 2B) that is perpendicular to and intersects the central axis 78. The electrode shaft 47 defines an electrode cross-sectional dimension E1 (FIG. 2B) that is perpendicular to a length of the shaft 47 and extends between opposed points (not shown) on the surface of the electrode shaft. The electrode cross-sectional dimension E1 is generally less than the throughhole cross-sectional dimension C1. Thus, the conductive element 75 can define a variable inner element cross-sectional dimension F that is typically equal to or less than the electrode cross-sectional dimension F when the conductive element is unbiased and in the recess 73. Thus, the conductive element 75, and the coiled member 76 in particular, provide multiple points of contact with the electrode shaft 47 so that when the shaft 47 slides along the central axis 78 through the throughhole 92 during make-up, electrical contact is maintained between the electrode shaft 47, the contact body 79, and the drill string 6. In the illustrated embodiment, the conductive element 75 may be a canted spring. For instance, the conductive element 75 by a garter-type axially resilient canted coil spring that provides equal force in all radial directions, therefore, providing multiple contact points resultant in sufficient and redundant contact with the inner surface 71 of the contact assembly 70 and shaft 47. In the illustrated embodiment, the conductive element is formed of conductive metal or material. Other conductive biasing members or materials can be used.

In a preferred example of the present disclosure, the EM tool 40 is a fixed mount tool that includes an electric contact assembly 70. The electric contact assembly includes the contact body 79 and the conductive biasing element 75, which defines the electric connection between the electrode shaft 47 of the EM tool 40 and the gap sub assembly 300. In a more preferred example of the present disclosure, the contact body 79 carries the canted spring 75. The shaft 47 can move along the canted spring 75 relative to the contact body 79 while maintaining contact between the canted spring and gap sub assembly 300 during make-up. When assembled, the canted spring defines electric contact between the shaft 47 and the gap sub assembly 300 during drilling operation for EM telemetry purposes.

While a ring shaped contact body 79 is shown, it should be appreciated that in an alternative embodiment, the contact body 79 can be a cylindrical body with a recess that carries a biasing element along an outer surface thereof. For instance, the contact body could have connecting members that extend from the contact body and are mounted to the inner surface of the gap sub assembly. The contact body would thus extend downhole from the connecting members and be spaced apart from the inner surface of the gap sub assembly. If an electrode shaft 47 is configured as a sleeve or tube, the electrode tube can slide along the outer surface of the contact body into slidable contact with the conductive element disposed in the recess. The length of the contact body and the distance from the connecting members to the outer recess can be such that the electrode tube could slide along the outer surface of the contact body along a range of length so as to accommodate any modifications in lengths to the intervening gap and/or flow sub components. So configured, the electrode tube can extend around the contact body while the connecting members would maintain electrical connection with the drill string 6. It should also be appreciated that other configurations of the contact assembly 70 are possible.

According to another embodiment, the present disclosure includes a method for assembling the drill string 6 and EM tool 40. Initially, drill string components, such as the gap sub assembly 300, flow sub 310, contact body 79 and EM tool 40 can be manufactured. The electric contact assembly 70 can be attached to a drill string component, such as the gap sub assembly 300, before make-up. Alternatively, the electric contact assembly can be attached to the drill string component, such as the gap sub assembly 300, during make-up.

During assembly at the drill site, the method includes assembling a drill bit 14 on the downhole end of the drill collar 320. The drill collar 320 and a drill bit 14 are then lowered in the bore hole. Next, the method includes positioning a drill string component, such as the flow sub 310 relative to the drill collar 320 and fixedly attaching the flow sub 310 to the uphole end of the drill collar 320. The flow sub 310, drill collar 320 and drill bit 14 are then lowered in the bore hole so that the uphole end of the flow sub 310 is arranged at a working elevation. It should be appreciated that the EM tool 40 include an uphole portion 41*a* (FIG. 1C), which is the electrode shaft 47, and a downhole portion 41*b*, which includes the electrode base 53 and/or the housing 48

(see FIG. 1C). As discussed above, the electrode shaft 47 can be separated from the electrode base 53 and then reattached to the electrode base 53 during makeup. The method can therefore include positioning the downhole portion 41b of the EM tool into the flow sub 310. For instance, the method includes mounting the housing 48 of the EM tool 40 to inner surface 56b of flow sub 310 at the downhole mount location 140. At this point during the method, the downhole portion 41b of EM tool 40 is supported by the second drill string component or the flow sub 310 at the mount location 140. Next, the method includes positioning the gap sub assembly 300 relative to the flow sub 310 along the longitudinal direction. In this regard, the method includes positioning the first drill string component 300 relative to the second drill string component 310 along the longitudinal direction. When the first and second drill string components are in position, the method includes placing an uphole portion 41b of the EM tool 40, for instance the electrode shaft 47, into slidable contact with the electric contact assembly 70. In particular, the method can include sliding the electrode shaft 47 through the contact assembly 70 so as to define an electrical connection between the uphole portion 41a of the EM tool and the first drill string component or gap sub assembly 300.

According to an embodiment, the gap sub assembly 300 is positioned on the flow sub 310 with the electric contact assembly 70 attached to the inner surface 56a of the gap sub assembly 300. According to such an embodiment, the method can therefore include sliding the electrode shaft 47 into throughhole 92 of the electric contact assembly 70. The electrode shaft 47 can be moved along the gap sub assembly 300 until a downhole end (not numbered) of the electrode shaft 47 mounts to the electrode base 53 and/or the downhole portion 41b of the EM tool 40 mounted to the flow sub 310. Alternatively, the electric contact assembly 70 is not attached to the gap sub assembly 300 when the gap sub assembly 300 is positioned on the flow sub 310. In such an embodiment, the electrode shaft 47 is slid into position and mounted to the electrode base 53. Then, the electric contact assembly 70 is placed over the electrode shaft 47 such that the shaft 47 slides through the throughhole 92. Thereafter, the electric contact assembly 70 is the threaded into place in the gap sub assembly 300. It can be said that the method includes placing an uphole portion 41a of the EM telemetry tool 40 is in electrical contact with the electric contact assembly 70 and drill string component 300. Further make-up operations can be completed and the drilling operation continued. For instance, the drill string and/or the drill bit 14 can be rotated so as to define the bore hole further into the earthen formation. Drilling can continue into the earthen formation, for instance, the drill string 6 and/or drill bit 14 can be rotated so as to define the bore hole. Drilling data can be obtained from the sensors 42, modulated into a EM signal, and the EM signal can be transmitted via the EM telemetry tool 40 to the surface.

When the drilling operation is complete, or when the BHA or drill bit 14 needs to be serviced or replaced, the drill string 6 can be removed from the borehole. As needed, the uphole portion 41a, for instance the electrode shaft 47, can be removed from the downhole portion 41b, for instance the electrode base 53 and/or housing 48. For instance, the electrode shaft 47 can slide in the uphole direction U through the throughhole 92. Next the gap sub assembly 300 can be removed from the flow sub 310. Then flow sub 310 and drill collar 320 can be elevated to the surface, and the flow sub 310 removed from the drill collar 320. During a subsequent run or during another drilling operation, the gap sub assembly 300, flow sub 310 and EM telemetry tool 40 can be assembled during a make-up operation as described herein for the subsequent drill run or drilling operation.

While the disclosure is described herein using a limited number of embodiments, these specific embodiments are not intended to limit the scope of the disclosure as otherwise described and claimed herein. Modification and variations from the described embodiments exist. More specifically, the following examples are given as a specific illustration of embodiments of the claimed disclosure. It should be understood that the invention is not limited to the specific details set forth in the examples.

What is claimed:

1. A method for assembling a drill string including an electromagnetic (EM) tool, the drill string when assembled configured to drill a borehole in an earthen formation and being elongate along a longitudinal direction, the EM tool having an uphole portion and a downhole portion, the method comprising: positioning a first drill string component relative to a second drill string component along the longitudinal direction, the first drill string component including an electric contact assembly that is configured to slidably receive the uphole portion of the EM tool, the downhole portion of the EM tool supported by the second drill string component; and placing the uphole portion of the EM tool in contact with the electric contact assembly so as to define an electrical connection between the uphole portion of the EM tool and the first drill string component, wherein the electric contact assembly is configured to permit the EM tool to move relative to the first drill string component while maintaining the electrical connection between the uphole portion of the EM tool and the first drill string component.

2. The method for assembling a drill string of claim 1, wherein the electrical contact assembly includes a contact body and at least one conductive biasing element carried by the electric contact body, the electric contact body and the at least one conductive biasing element defining a throughhole that receives the uphole portion of the EM tool, wherein the step of placing the uphole portion of the EM tool includes sliding the uphole portion of the EM tool through the throughhole.

3. The method for assembling a drill string of claim 1, wherein the first and second drill string components are configured to be assembled such that there is at least one electrical discontinuity along the first and second drill string components, wherein the method further comprises the step of attaching the first drill string component to the second drill string component.

4. The method for assembling a drill string of claim 3, wherein the at least one electrical discontinuity is a portion of a gap sub assembly.

5. The method for assembling a drill string of claim 2, wherein the uphole portion of the EM tool is an electrode shaft, the first drill string component is a gap sub assembly, and the second drill string component is a flow sub, and the downhole portion of the EM tool is a housing that is attached to the flow sub.

6. The method for assembling a drill string of claim 2, further comprising the steps of: attaching a drill bit to a drill collar; and attaching the second drill string component to the drill collar, the second drill string component being a flow sub.

7. The method for assembling a drill string of claim 1, wherein the electric contact assembly includes at least one conductive biasing element configured to slidably receive the portion of the EM tool.

8. The method for assembling a drill string of claim 7, wherein the at least one conductive biasing element is at least one canted spring.

9. The method for assembling a drill string of claim 1, further comprising attaching the downhole portion of the EM tool to the second drill string component.

10. The method for assembling a drill string of claim 1, wherein the first drill string includes an inner surface, an opposed outer surface, and a passage defined by the inner surface; and further comprises attaching the electric contact assembly to the inner surface of the first drill string component.

11. A drill string component assembly for a drilling system, the drilling system configured to drill a borehole in an earthen formation, the drill string component assembly comprising: an electromagnetic (EM) telemetry tool that includes an electrode assembly, a transmission assembly configured for electrical connection to the electrode assembly, and an electric contact assembly, the electric contact assembly includes an electric contact body and at least one conductive biasing element carried by the contact body, the electric contact body including an outer surface, an opposed inner surface, and a throughhole that extends along the inner surface, the throughhole sized to receive a portion of electrode assembly, the at least one conductive biasing element at least partially defining the throughhole, the at least one conductive biasing element configured to define an electrical connection between the received portion of the electrode assembly and the contact body, wherein the electric contact assembly is configured to permit the received portion of the EM tool to slide in the throughhole during assembly of the drill string.

12. The drill string component assembly of claim 11, wherein drilling system includes a drill string, wherein the electric contact assembly is configured to be attached to the drill string.

13. The drill string component assembly of claim 11, further comprising first and second drill string components that are configured to be assembled such that there is at least one electrical discontinuity along the first and second drill string components, wherein the electric contact assembly is configured to be attached to one of the first and second drill string components and the transmission assembly is configured to be mounted to the other of the first and second drill string components.

14. The drill string component assembly of claim 11, further comprising a flow sub assembly, wherein the transmission assembly is configured to be mounted to the flow sub.

15. The drill string component assembly of claim 11, further comprising a gap sub assembly, wherein the electric contact assembly is configured to be attached to the gap sub assembly.

16. The drill string component assembly of claim 11, wherein the contact assembly body defines a central axis, a first end, and a second end spaced from the first end along the central axis, and the throughhole extends along at least a portion of the central axis.

17. The drill string component assembly of claim 11, wherein the contact assembly body includes at least one recess that extends into the inner surface of the contact assembly body, the at least one conductive biasing element is retained in a respective one of the at least one recess.

18. The drill string component assembly of claim 11, wherein the at least one conductive biasing element is at least one canted spring.

19. The drill string component assembly of claim 11, wherein the electrode assembly includes an electrode shaft, and the throughhole is sized and configured to receive an outer surface of the electrode shaft.

20. An electric contact assembly configured to electrically connect a portion of an electromagnetic (EM) telemetry tool to a portion of a drill string configured to drill a borehole in an earthen formation, the electric contact assembly comprising: an electric contact body configured to fixedly attach to the drill string, the electric contact body including an outer surface, an inner surface, and a throughhole that extends along the inner surface, the throughhole sized to receive a portion of the EM tool; and; at least one conductive biasing element carried by the inner surface of the electric contact body so as to at least partially define the throughhole, the at least one conductive biasing element configured to define an electrical connection between the received portion of the EM tool and the contact body, wherein the electric contact assembly is configured to permit the received portion of the EM tool to move in the throughhole while maintaining the electrical connection between the received portion of the EM tool and the electric contact body.

21. The electric contact assembly of claim 20, wherein the contact assembly body defines a central axis, a first end, and a second spaced from the first end along the central axis, and the throughhole extends along at least a portion of the central axis.

22. The electric contact assembly of claim 20, wherein the contact assembly body includes at least one recess that extends into the inner surface, the at least one conductive biasing element is retained in a respective one of the at least one recess.

23. The electric contact assembly of claim 22, wherein the at least one conductive biasing element is at least one canted spring.

24. The electric contact assembly of claim 20, wherein the portion of the EM tool is an electrode shaft, and the throughhole is sized and configured to receive the electrode shaft.

25. The electric contact assembly of claim 20, wherein the contact assembly body defines a central axis and a plurality of passages that extend along the central axis, each passage being offset with respect to the central axis.

26. The electric contact assembly of claim 25, wherein the contact assembly body defines a ring shaped body centered about the central axis, the contact assembly body including an outer wall that defines the outer surface, an inner wall spaced from the outer wall, the inner wall at least partially defining the throughhole, a plurality of connection members that connect the outer wall to the inner wall, wherein the outer wall, the inner wall, and the plurality of connection members define the plurality of passages.

27. The electric contact assembly of claim 26, wherein the inner surface of the inner wall includes at least one recess, the at least one recess configured to hold a respective one of the at least one conductive biasing element.

28. A drilling system configured to define a borehole in an earthen formation, the drilling system comprising: a drill string elongate along a longitudinal axis and having an uphole end, a downhole end spaced from the uphole end along the longitudinal axis, an internal passage extending along the longitudinal axis, and a drill bit carried by the downhole end; an EM telemetry tool in the internal passage and attached to the drill string, the EM telemetry tool defining a top portion and a bottom portion spaced from the top portion toward the downhole end of the drill string, the EM telemetry tool including an electric contact assembly attached to the drill string, the electric contact assembly including an electric contact body including an outer surface, an opposed inner surface, and a throughhole that extends along the inner surface, the electric contact assembly including at least one conductive biasing element carried by the inner surface of the contact body so as to at least partially define the throughhole, the throughhole configured to moveably receive the top portion of the EM telemetry tool, wherein the at least one conductive biasing element is configured to define a moveable electrical connection between the top portion of the EM tool and the drill string.

29. The drilling system of claim 28, wherein the top portion of the EM telemetry tool is an electrode shaft.

30. The drilling system of claim 28, wherein the drill string includes a first and second drill string components, the first and second drill string components being assembled such that there is at least one electrical discontinuity along the first and second drill string components.

31. The drilling system of claim 28, wherein the electric contact assembly is configured to be attached to the drill string in an uphole direction from the at least one electrical discontinuity.

32. The drilling system of claim 28, further comprising a gap sub assembly, wherein the electric contact assembly is configured to be attached to the gap sub assembly.

33. The drilling system of claim 32, further comprising a flow sub assembly, the transmission assembly being configured to be mounted to the flow sub, wherein the gap sub assembly is attached to the flow sub.

34. The drilling system of claim 32, wherein the gap sub assembly is a dual gap sub or single gap sub.

35. The drilling system of claim 28, wherein the EM telemetry tool is a fixed mount tool.

36. The drilling system of claim 28, wherein a drill collar is attached to a downhole end of the flow sub, and the drill bit is attached to the drill collar opposite the flow sub.

37. The drilling system of claim 28, wherein the electric contact body defines a plurality of passages offset from the throughhole toward the outer surface of the electric contact body, the plurality of passages sized and configured to permit a fluid to pass therethrough.

38. The drilling system of claim 28, wherein the at least one conductive biasing element is at least one canted spring.

39. The drilling system of claim 28, wherein the electrical connection is a first electrical connection, and wherein the downhole portion of the EM telemetry tool defines a second electrical connection with the drill string, the second electrical connection being downhole relative to the first electrical connection, wherein an electromagnetic field is created by alternating a charge between the first electrical connection and the second electrical connection.

* * * * *